United States Patent Office 3,112,209
Patented Nov. 26, 1963

3,112,209
MODIFIED TALL OIL-POLYOL ESTERS AND ADDUCTS, AND COATING COMPOSITIONS CONTAINING THE SAME
John J. Bradley, Jr., Winchester, Mass., assignor, by mesne assignments, to Agrashell, Incorporated, Los Angeles, Calif., a corporation of Delaware
No Drawing. Filed Sept. 18, 1959, Ser. No. 840,896
15 Claims. (Cl. 106—123)

This invention relates to coating compositions and to modified tall oil ester-acid compositions for use in water base and organic base coatings in linoleum compounds. In an important embodiment, it relates to coating compositions comprising aqueous dispersions of modified tall oil esters, either pigmented or unpigmented, for floor coverings.

Tall oil, a by-product recovered in the process of the manufacture of paper by the sulfate-sulfite process, is principally composed of rosin and fatty acids, sterols and unsaponifiable matter. The several grades of tall oil produced in commercial quantities include crude or whole, distilled, multiple distilled and fractionated products. The crude products may contain as much as 45–55% rosin acids; the fractionated products as low as 1–2% rosin acids. All of these tall oils have been utilized in the commercial production of oil modified resins, paints, sealing compounds, and other applications.

Certain of the known tall oil esters have been suggested for use in emulsion paints as sealant undercoats for printed felt base floor coverings, conventional linoxyn (oxidized rosin-linseed oil) and vinyl resin linoleums. Their use has been limited, however, due to their inherent properties of slow-dry, soft film, pinhole defects and low resistance of the dry film to water.

It is an important object of this invention to provide coating compositions containing modified tall oil esters which do not have the defects mentioned above.

It is another object of this invention to prepare sealants for the flooring industry comprising aqueous dispersions of modified tall oil esters.

It is a further object of this invention to provide stable aqueous emulsions of modified tall oil esters which, when pigmented, provide paints that are thixotropic and have exceptional sealing and hold-out properties when applied over asphalt saturated felt, the conventional base for printed flood coverings.

Another object is to provide new modified tall oil ester-acid compositions.

A final object which will be mentioned is to provide new and improved coating compositions comprising modified tall oil esters in solution in organic solvents.

Other objects and advantages of this invention will be apparent from the more detailed description which follows.

It has now been found that superior coating compositions can be provided by including in such compositions, as film-forming ingredients, polyol esters of tall oil modified with certain reactive aluminum acylate compounds, as defined below. These modified tall oil esters may be dispersed readily in water for the production of oil-in-water (O/W) coating compositions or dissolved in hydrocarbon solvents for the preparation of organic carrier coating compositions.

The aluminum acylate compounds utilizable in the process of the present invention are hydroxy, alkoxy aluminum acylates and their condensation products, and oxo-aluminum acylate polymers, including cyclic and linear polymers, as are disclosed, for example, in the patent applications Serial No. 495,765 (now U.S. Patent 2,913,468) and No. 706,902 (now abandoned), of Jacobus Rinse. Examples of linear polymers are described in the patent literature, and no novelty per se as to the same is alleged herein. The corresponding hydroxy, phenoxy aluminum acylates may be used somewhat less advantageously.

The alkoxy, phenoxy and acylate radicals attached to the aluminum atom may each contain a hydrocarbon chain of any number of carbon atoms of any configuration, as from 2 to 22 or more carbon atoms, and such chain may be unsubstituted or it may be substituted with non-functional groups or with functional groups as hydroxy, carboxy, ester, ether and keto groups which do not interfere with the reaction. The alkoxy group attached to the aluminum atom may be either normal or iso and is preferably produced from lower molecular alcohols of up to 10 carbon atoms. The aryloxy groups contemplated include the phenoxy group and cresoxy groups as well as other alkyl-phenoxy groups, especially those of relatively low boiling phenolic compounds as those having up to 5 carbon atoms in the alkyl chain. The acylate radical may be derived from any monocarboxylic acid including saturated and unsaturated acids from formic to oleic and stearic acids, higher molecular fatty acid radicals being preferred as those having from 8 to 22 carbon atoms. It also may be derived from corresponding cycloaliphatic acids such as the naphthenic acids and hexahydrobenzoic acid, or from aromatic acids such as benzoic acid, and finally, from abietic and other rosin acids.

Typical reactive aluminum acylates adapted for the processes of this invention include hydroxy isopropoxy aluminum oleate, stearate, laurate and the like and also the trimeric, cyclic oxo-aluminum acylates of said acids. Also, hydroxy phenoxy aluminum oleate and the like may be used. Hydroxy isopropoxy aluminum oleate is commercially available dispersed as 67% solids in odorless mineral spirits.

The tall oils suitable for use in the process of the invention are of the type described above. Tall oils containing a considerable percentage of rosin acids may be used to particular advantage typified by commercially available tall oils containing of the order of 25–30% rosin. When modified as disclosed herein, however, they are substantially superior to the tall oil esters discussed above.

The polyol used for ester formation are preferably those heretofore used in the coating industry and include such compounds as glycerine, sorbitol, pentaerythritol, and the like.

In accordance with a special and generally preferred feature of the invention, the tall oil or its ester is also reacted with a dibasic unsaturated acid to form an adduct. Suitable acids include unsaturated adduct forming dibasic acids, including their anhydrides, such as maleic acid anhydride, fumaric acid, and other such acids that contain a C=C linkage. Conventional adduct forming or equivalent quantities of the unsaturated acids, or anhydrides, may be used or amounts within for example 4 to 8% by weight of the tall oil.

In order to modify the tall oil esters the reactive aluminum acylate compound should be added during the course of the ester formation. Generally speaking, the reaction will take place at ester forming reaction temperatures. In accordance with a preferred practice, the tall oil is reacted either with the polyol or the unsaturated acid, or with both, before it is reacted with the reactive aluminum acylate compound. When reacting with an unsaturated acid, the aluminum compound should be added after the reaction with the acid is completed. At this time, the aluminum compound is considered to act as a cross linking agent for the tall oil adduct which contains several carboxyl groups that are readily available for reaction. When added in this manner, the aluminum compounds after having reacted with the tall oil ester compound, still possess the capacity to orientate other active groups to the aluminum atoms (by secondary bonds) thereby causing an increase in viscosity in the products formed. Addition of the aluminum acylate compounds to the tall oil prior to the reaction of the tall oil with an unsaturated dibasic acid has thus far produced products that are less easy to emulsify and, when pigmented, are less stable than emulsion paints produced by the preferred procedure.

The addition of and reaction with even very small amounts of reactive aluminum acylate compounds greatly improves the quality of the tall oil esters. Usually less than 5% and frequently only about 2% of the aluminum acylate compound, based upon the weight of tall oil, is adequate to impart the desirable qualities. Larger quantities of the aluminum acylate may be used. For example, as much as 10% to 15% can be employed.

In an important embodiment of the invention, the coating compositions comprise a stable aqueous dispersion of the modified tall oil esters. The reaction with aluminum acylate compounds herein described provides a modified tall oil ester which may be easily emulsified. When the modified tall oil esters are emulsified and compounded with pigments, paints of the O/W (oil-in-water) type are formed which are highly thixotropic and provide coatings having exceptional hold-out and sealing properties upon being applied as an undercoat over porous surfaces, such as asphalt saturated felt used as a base in the manufacture of floor coverings. These aqueous emulsion paints, unlike those thinned with hydrocarbons and/or aromatic solvents, cause no bleeding of the asphalt contained in the saturated felt.

The modified tall oil esters of this invention are highly viscous but may be easily emulsified at room temperature (65–85° F.) with the use of a small amount of a suitable emulsifying agent. Normally about 2% of the emulsifying agent, based upon tall oil content, is sufficient. In general, polyether or polythioether non-ionic emulsifying agents typified by the alkylaryl polyalkylene glycols are preferred, since they do not have any effect upon the pH of the coating composition. Likewise, other polyethers derived from high molecular weight alcohols or high molecular weight fatty acids may be used as non-ionic emulsifying agents. Anionic emulsifiers, such as high molecular weight primary and secondary alkyl sulfates and alkylaryl sulfonates, may be used to somewhat less advantage. Where their ionizing properties are not deleterious, anionic emulsifiers may be preferred for economic reasons. Cationic emulsifying agents having a proper balance in lipophilic and hydrophilic groups may be used also, but have no particular advantage.

After the addition of suitable pigments, the formed emulsions comprise aqueous dispersion paints that are stable for long periods of time. The concentration of the modified tall oil ester in the dispersion is not critical. Emulsions can be prepared containing from 5 to 85% of the modified tall oil esters.

The neutral character of the formed modified tall oil ester emulsions, usually a pH of 5.9–6.95, permits the use of a variety of pigments of both alkaline and acid properties in aqueous systems.

The pigmented liquid coating compositions of this invention are applicable not only as sealers and undercoats for saturated felt base and linoleum products, but also as water base paints for general use over wood, plaster, concrete, and other surfaces.

The tall oil-polyol esters, and their adducts with unsaturated dibasic acids, modified by reaction with the aluminum acylate compounds as hereinbefore disclosed, can be employed for the production of organic solvent type coating compositions by dissolution of the same in any of the usual organic solvents employed in oil or resin type varnishes and paints including the volatile hydrocarbons of aliphatic and aromatic character (as solvent naphtha, mineral spirits and xylene), the amount of solvent utilized usually being from 40–50% by weight of the finished clear coating composition. By adding pigments to the clear composition, paints can be prepared, the amount being such as will produce final dry coatings constituting about 55–60%, by weight, of the applied liquid composition.

The tall oil-polyol ester adducts with maleic anhydride modified by reaction with the aluminum acylate compounds, as herein disclosed are new and may be used to advantage not only in the coating compositions hereinbefore disclosed but also in the production of linoleum cements for the manufacture of inlaid grades of linoleum and similar compositions, the method and details of compounding and oxidizing being known in the art and described in the patent applications of Joseph W. Ayers, Serial No. 519,223 (now U.S. Patent 2,936,243) and No. 519,225 (now U.S. Patent 2,936,244), filed April 5, 1955.

The following examples will illustrate the invention, but do not limit its scope. In the examples parts and percentages are expressed in parts and percentages by weight. G-H will have reference to Gardner-Holdt.

*Example 1*

A tall oil containing 28% of rosin acids was reacted with 6% of maleic anhydride at 250° C. for one hour under carbon dioxide gas. Then hydroxy aluminum isopropoxy oleate (2% based on the tall oil) was added and the temperature held at 250° C. for 40 minutes. Pentaerythritol, technical grade, was then added in the amount of 12% of the tall oil and the esterification reaction continued at 280° C. until an acid number of 20–25 was obtained.

The final constants of the reaction product cooled to room temperature showed a viscosity of Z–5—Z–6 (G-H tubes), a color (Gardner) of 9 and an acid number 22.5.

Soluble metal driers in the forms of lead naphthenate, manganese naphthenate and cobalt naphthenate were added to the ester in the amounts respectively of 0.75% lead, 0.787% manganese, 0.0525% cobalt based on the weight of the ester.

An aqueous emulsion was made from this ester with a nonionic alkylaryl polyglycol ether dispersion agent known as Tergitol NPX, at room temperatures (60–85° F.) showed no separation in 10 days standing.

Pigmentation of this stable emulsion with red slate and clay in the ratio of 100 emulsion solids, 200 red slate, 100 clay and 120 water (a paint of 25% binder solids) baked at 165° F. for 1½ hours produced a hard, flexible film when applied over asphalt saturated felt.

A commercial flooring print paint applied by block printing over the baked single undercoat shows some pitting but excellent gloss and hold-out. A second undercoat of the same paint applied over the first coat eliminates the pitting and provides a smooth and continuous surface for the application of a print paint.

*Example 2*

An ester made by reacting 1605 grams of a tall oil containing 28% of rosin acids (Indusoil M–28) was reacted with 100 grams of maleic anhydride under carbon dioxide gas at 250° C. for one hour. A portion (200 grams of the maleinized tall oil) was removed from the reaction kettle, cooled to 25° C. and 32 grams (2% based on tall oil) of hydroxy aluminum isopropoxy oleate was added by stirring for 20 minutes and thereafter added to the kettle at 250° C. and this temperature (250° C.) held for 40 minutes under carbon dioxide gas. After the addition of 200 grams of pentaerythritol (Pentek) at 250° C. and an increase in temperature to 280° C. for a period of 5 hours the ester showed an acid number of 22.5, a viscosity (G-H tubes) of Z–5—Z–6 and a color of 8–9 0.07% lead, 0.03% manganese and 0.0075% cobalt.

(G-H Comparator). Driers were added to this ester as

Emulsions made from this ester with 2% of a nonionic alkylaryl polyglycol ether dispersing agent, Tergitol NPX based on ester at 25° C. at 40% ester solids in water showed no separation in 10 days. pH—6.0.

Pigmented paints made to contain only 25% of solids binder dried hard and flexible in 1½ hours at 165° F. Printed samples showed good hold-out and, in two coat systems, high gloss and no pin-holing.

*Example 3*

A tall oil containing 28% rosin acids was maleinized with 6% maleic anhydride at 250° C. for one hour under carbon dioxide gas. Pentaerythritol (Pentek) was added and the temperature increased to 280° C. until an acid number of 25 was obtained. A portion (5%) of this ester was removed from the reaction vessel, and only 2% (based on tall oil) of hydroxy aluminum isopropoxy oleate added with continued stirring for two (2) hours, after which the acid number of the resultant ester decreased from 25 to 16, a reduction of 36% in free acidity.

After the addition of soluble driers, lead naphthenate and manganese naphthenate in the respective amounts of 0.75% and 0.18% at 25° C., the ester was readily emulsified at 25° C. with 2% of a nonionic dispersion agent, Tergitol NPX, as defined above, or Nonic-300 at 60% solids. This emulsion was stable for a period of seven days, after which some separation of water was noted.

*Example 4*

A commercial tall oil containing 25–28% of rosin acids was reacted with 6% of maleic anhydride under carbon dioxide gas at 250° C. for one hour. Hydroxy aluminum isopropoxy oleate, 67% solids in odorless mineral spirits, was added to a 10% portion of the maleinized tall oil which had been cooled to 25° C. The aluminum complex was added to the maleinized tall oil at 250° C. slowly over a period of 30 minutes to avoid local reaction and the temperature of the mass maintained at 250° C. for 40 minutes. Pentaerythritol (Pentek) in the amount of 10% based on the maleinized ester was added and the temperature increased to 280° C. and held at 280° C. for five hours until an acid number of 22.5 was obtained. The viscosity (G-H tubes) and color (G-H tubes) of this ester were respectively Z–5—Z–6 and 8–9.

The addition of soluble driers as lead and manganese compounds in the amounts of .072% and .018%, respectively, provides films that dry rapidly and are resistant to softening by the action of water.

Emulsions of this ester vehicle made with 2% of a nonionic dispersion agent, such as described above, and stabilized with 0.65% of carboxy methyl cellulose are stable at 60% solids at a pH of 6.5.

Pigmentation of this emulsion at 25% binder solids with red slate and clay resulted in a paint which, when applied over asphalt saturated felt and dried at 150° F. for 1½ hours, showed excellent gloss and flexibility as a single coat applied at 0.003 inch thickness. When applied in two coats at 0.005 inch, gloss was excellent and no pitting or pin-holing noted.

A coating of this emulsion paint applied at 0.001 inch thickness dried in 2 minutes at 150° F. over hot (150° F.) asphalt-saturated felt.

*Example 5*

The emulsion used in this example was the same as that described in Example 4. The pigment added to the emulsion was changed and instead a white paint was prepared. Thirty parts of titanium dioxide, 60 parts of clay and 120 parts of whiting were blended by dry mixing. This blend of dry pigments was wetted by addition of 94 parts of water containing 1 part of a 14 carbon atom sodium alkyl sulfate, an anionic wetting agent (Tergitol 4).

The emulsion was slowly added to the wetted pigments to form an emulsion paint of pH 6.2 of 25% binder solids which, baked at 150° F. for 2 hours, formed a continuous, flexible film that showed no pin-holing when printed with a gloss print paint.

The same paint applied at 1 mil thickness as a backing paint on hot (150° F.) saturated felt was tack-free and could be handled without transfer in 2 minutes.

In contrast with the foregoing, esters made with maleic anhydride and pentaerythritol, in the same amounts as shown in Example 5 but with no hydroxy isopropoxy aluminum oleate, showed an acid number of 39, a viscosity (G-H tubes) of Z–6. Emulsions made from this vehicle with any type (anionic, cationic or nonionic) dispersion agent were stable for only 24 hours at room temperature (77° F.). Paints made from these unstable emulsions had little or no thixotropic properties. They pin-holed badly on both single and double coats and had poor holdout for block printed gloss paints.

The degree of thixotropy exhibited by the water-base compositions of the present invention is extremely high, in fact, when in a static state, they have a gel-like consistency. However, the application of slight pressure such as stirring, mixing, pumping or coating blade, immediately makes them become fluid and easy to apply.

The phenomena of gel structures and rheology in emulsion systems are not well known and are difficult to measure. However, measurements made with a Brookfield viscosimeter of the pigmented emulsion of Example 4 using a #3 spindle at varied speeds indicate the degree of thixotropy as expressed in figures.

|  | Cps. |
|---|---|
| At static condition (G-H tubes) | 10,000 |
| #3 spindle (6 r.p.m.) | 1,800 |
| #3 spindle (12 r.p.m.) | 1,500 |
| #3 spindle (30 r.p.m.) | 1,140 |
| #3 spindle (60 r.p.m.) | 920 |

These figures illustrate the elastic properties of the emulsion gel.

*Example 6*

The tall oil-polyol ester adduct with maleic acid modified by reaction with cyclic oxo-aluminum oleate trimer, and added drier, according to the procedure of Example 1 is mixed with V.M. & P. naphtha in a quantity providing a 45% solution by weight. A clear coating composition is thereby obtained.

Variations in the examples disclosed will be apparent to those skilled in the coating arts. Substitution of polyols in amount and/or in type will result in products that have somewhat different properties as to speed-of-dry, hardness, flexibility and sealing.

In the processes of producing the modified tall oil ester products described in the foregoing examples the maleic anhydride component may be omitted without change in conditions, but only with loss of desirable properties. Other aluminum compounds may be substituted in equivalent amounts for those used in the processes, examples of which are hydroxy aluminum isobutoxy laurate and stearate, and trimeric cyclic oxo-aluminum oleate and palmitate.

It will be understood that the present invention is not limited to the specific details disclosed herein for illustrative purposes. Details as to procedure, reactants, and proportions thereof, processing conditions and the like, will readily occur to those skilled in the art without departing from the scope or spirit of the invention which the claims appended hereto are intended to define.

I claim:

1. A liquid coating composition containing, as a film-forming ingredient, a tall oil-polyol ester modified by reaction with from 2 to 15 percent, by weight of tall oil in said ester, of an aluminum acylate compound selected from the group consisting of hydroxy alkoxy aluminum acylates and oxo-aluminum acylate polymers.

2. A liquid coating composition, comprising a tall oil-polyol ester modified by reaction with from 2 to 15 percent, by weight of tall oil in said ester, of a hydroxy alkoxy aluminum acylate, said acylate radical being a fatty acid radical of at least 10 carbon atoms.

3. A liquid coating composition, comprising a tall oil-polyol ester modified by reaction with from 2 to 15 percent, by weight of tall oil in said ester, of a hydroxy isopropoxy aluminum oleate.

4. A liquid coating composition, comprising a tall oil-polyol ester modified by reaction with from 2 to 15 percent, by weight of tall oil in said ester, of an oxo-aluminum acylate polymer, said acylate radical being a fatty acid radical of at least 10 carbon atoms.

5. A liquid coating composition, comprising a tall oil-polyol ester modified by reaction with from 2 to 15 percent, by weight of tall oil in said ester, of a cyclic oxo-aluminum acylate trimer.

6. A liquid coating composition, comprising an unsaturated dicarboxylic acid adduct of a tall oil-polyol ester modified by reaction with from 2 to 15 percent, by weight of tall oil in said adduct, of an aluminum acylate compound selected from the group consisting of hydroxy alkoxy aluminum acylates and oxo-aluminum acylate polymers.

7. An unsaturated dicarboxylic acid adduct of a tall oil-polyol ester modified by reaction with from 2 to 15 percent, by weight of tall oil in said adduct, of an aluminum acylate selected from the group consisting of hydroxy alkoxy aluminum acylates and oxo-aluminum acylate polymers.

8. A liquid coating composition, comprising an aqueous dispersion of a tall oil-polyol ester modified by reaction with from 2 to 15 percent, by weight of tall oil in said ester, of a hydroxy alkoxy aluminum acylate.

9. A liquid coating composition, comprising an aqueous dispersion of a tall oil-polyol ester modified by reaction with from 2 to 15 percent, by weight of tall oil in said ester, of a hydroxy isopropoxy aluminum oleate.

10. A liquid coating composition, comprising an aqueous dispersion of a tall oil-polyol ester modified by reaction with from 2 to 15 percent, by weight of tall oil in said ester, of an oxo-aluminum acylate polymer.

11. A liquid coating composition, comprising an aqueous dispersion of a tall oil-polyol ester modified by reaction with from 2 to 15 percent, by weight of tall oil in said ester, of a cyclic-oxo-aluminum acylate polymer.

12. A liquid coating composition, comprising an aqueous dispersion of a reaction product obtained by reacting tall oil with an unsaturated dicarboxylic acid to form an adduct and then reacting the reaction product with a polyol and from 2 to 15 percent, by weight of tall oil in said adduct, of an aluminum acylate compound selected from the group consisting of hydroxy alkoxy aluminum acylates and oxo-aluminum acylate polymers.

13. A process for producing a modified tall oil-polyol ester, comprising first reacting tall oil with an unsaturated dicarboxylic acid to form an adduct and then reacting the obtained reaction product with a polyol and with from 2 to 15 percent, by weight of the tall oil in said adduct, of an aluminum acylate compound selected from the group consisting of hydroxy alkoxy aluminum acylates and oxo-aluminum acylate polymers.

14. A maleic acid adduct of a tall oil-polyol ester modified by reaction with from 2 to 15 percent, by weight of tall oil in said adduct, of a cyclic oxo-aluminum acylate trimer.

15. A liquid coating composition comprising an unsaturated dicarboxylic acid adduct of a tall oil-polyol ester modified by reaction with from 2 to 15 percent, by weight of tall oil in said adduct, of an aluminum acylate selected from the group consisting of hydroxy alkoxy aluminum acylates and oxo-aluminum acylate polymers, in solution in a volatile hydrocarbon solvent.

References Cited in the file of this patent

UNITED STATES PATENTS

| | | |
|---|---|---|
| 2,815,295 | Forsythe | Dec. 3, 1957 |
| 2,835,685 | Rinse | May 20, 1958 |
| 2,936,243 | Ayers | May 10, 1960 |
| 2,936,244 | Ayers | May 10, 1960 |
| 2,937,103 | Forsythe | May 17, 1960 |

OTHER REFERENCES

Official Digest (Federal Paint and Varnish Prod. Clubs), November 1948, pages 845–848.

Paint, Oil and Chemical Review, Dec. 14, 1944, pp. 14 and 16.